Nov. 29, 1955   J. McORLLY   2,725,455
ELECTRIC HEATING DEVICES
Filed Dec. 15, 1951   2 Sheets-Sheet 1

INVENTOR.
JOSEPH McORLLY
BY C. B. Stevens
Attorney

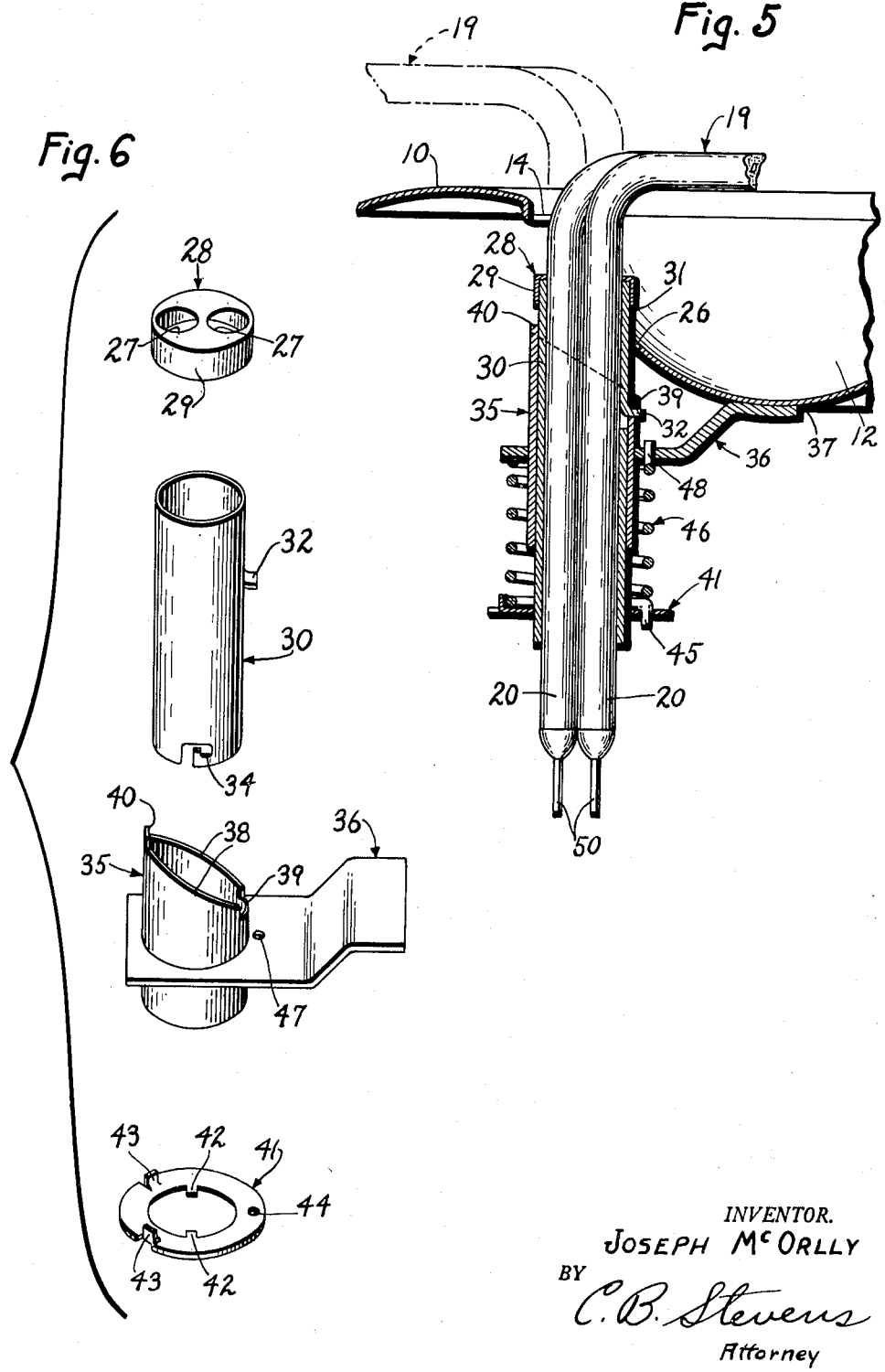

United States Patent Office 2,725,455
Patented Nov. 29, 1955

2,725,455

ELECTRIC HEATING DEVICES

Joseph McOrlly, Wilkinsburg, Pa., assignor to Edwin L. Wiegand Company, Pittsburgh, Pa., a corporation of Pennsylvania Application December 15, 1951, Serial No. 261,857

15 Claims. (Cl. 219—37)

This invention pertains to an electric heating device of the type adapted for use with a cooking range or hot plate.

It is generally customary in cooking ranges or hot plates to have a heating element which may be either a flat plate or a convoluted tubular element, or elements, shaped to present a flat heating surface or area to the article or material to be heated. In many instances the material to be heated, or the receptacle containing the material to be heated has a bottom surface which is uneven so that all parts of the surface are not coincident with the heating surface of the heating element when the material or receptacle is placed thereon. This results in loss of efficiency since various areas of the heating element will not be in contact with the material or receptacle to be heated, and any heat transferred to the material or receptacle from the heating element results only from radiation and convection. For example, it is well known that many receptacles are either initially provided with or ultimately attain slightly concave or slightly convex bottom surfaces either wholly or in part.

It is one object of this invention to provide a heating element of an electric heater which is shaped to accommodate at least slight variations in the bottom of a receptacle, or the area of an article to be heated, which will compensate for such variations, whether the result of concavities or convexities, and will make it possible for the maximum area of the heating element to directly contact the coincident surface of the article or receptacle resting on the heating element.

More particularly, the invention comprises a heating element shaped to provide a plurality of convolutions, with each convolution having an active surface lying in a successively higher plane in a manner to provide an article receiving area which is generally convex or frustoconical in vertical cross section, and with the innermost convolution the highest. A non-yielding support is provided for the outermost convolution, and the heating element is such that the convolutions are yieldable so that the inner convolutions are capable of flexing under the weight of an article applied thereto to provide an article receiving area substantially conforming to the surface of the article which is coincident thereto. The construction is such that the inner convolutions may be flexed from a position defining an article receiving area convex in cross section to a position defining an article receiving area that is concave in cross section, and to restrict the depression movement of such convolutions to a degree less than that which would exceed the elastic limit of such convolutions an interceptor means is provided which is effective to limit the depression movement of the convolutions. The heating element convolutions are of such size and are so constructed and arranged as to have the characteristic of springing back to the normal position in which the heating element is generally convex in vertical cross section when there is no weight thereon.

Various other objects and advantageous features of the invention may be had from the following description when taken in conjunction with the accompanying drawings wherein similar characters of reference designate corresponding parts, and wherein:

Figure 5 is a fragmentary view, taken on the line 5—5 of Figure 1, showing a hinged mounting for the heating element; and Figure 6 is an exploded view showing various parts of the hinged mounting in dissembled relation.

Figure 1:
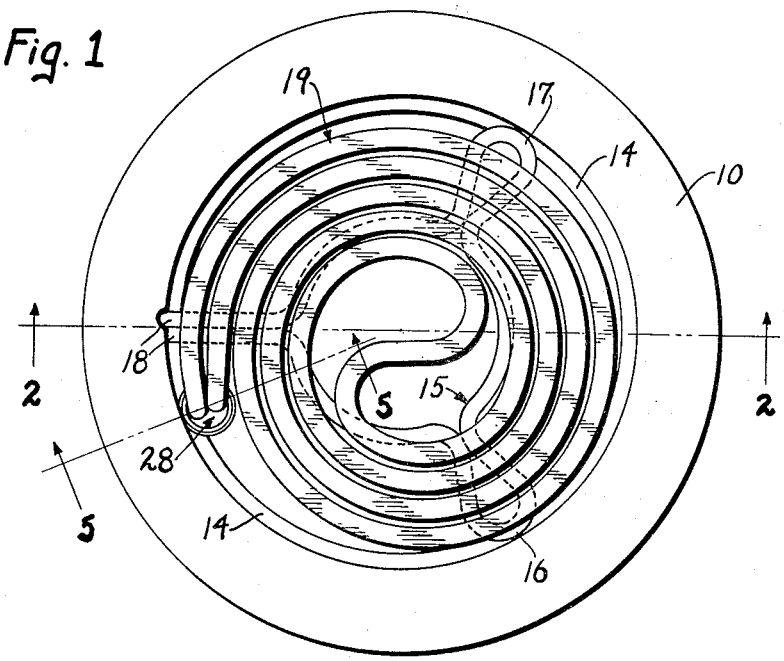
Figure 1 is a plan view of a heating element embodying the features of this invention.
Figure 2:
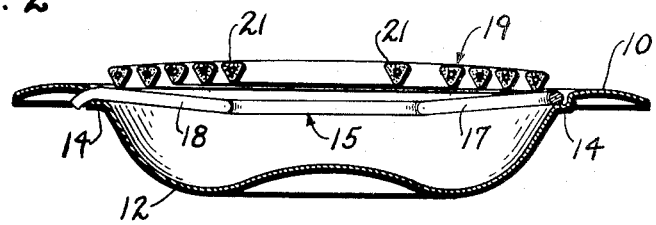
Figure 2 is a view, partly in section and partly in elevation, taken on the line 2—2 of Figure 1.

Referring to Figures 1 and 2 of the drawings, there is shown a heater comprising a ring 10 for supporting the heater in, for example, the opening in a range top, and a reflector and drip pan 12 which is disposed beneath the heater element. As herein shown the ring 10 and drip pan 12 are formed in one piece, and in such manner as to provide an inwardly extending annular ledge or shoulder 14 at substantially the junction of the ring 10 with the reflector and drip pan 12. It is understood, however, that the supporting ring 10 and reflector and drip pan 12 may be separate parts as is well known in the art.

Resting on the annular ledge or shoulder 14 is a spider or support 15 which, for illustrative purposes only, is shown as a support consisting of a single length of rod-like metal shaped to form two loops 16 and 17 which extend radially outwardly from the center, and a pair of radially extending legs 18 likewise extending outwardly from the center of the spider or support. The spider or support is so formed that the two loops 16 and 17 rest on the ledge or shoulder 14 at spaced points, so that at least one of the legs 18 will extend through an opening in the ring or drip pan 12 immediately above the ledge or shoulder 14 to properly center or position the spider or support with respect to the ledge or shoulder 14 and to retain the spider or support in position. The spider or support 15 may take other forms.

In accordance with this disclosure, a heating element 19 consisting of a tubular sheathed embedded-resistor element is wound upon itself, or otherwise shaped, to provide a series of convolutions and two terminal ends 20 for connection of the resistor of the heating element with a suitable source of current supply. The heating element 19, shown in Figures 1 through 6, is so shaped that the successive convolutions lie in successively higher planes, with the innermost convolution 21 being the highest, to thereby provide an article receiving area which is generally convex or frustoconical in vertical cross section.

Figure 3:
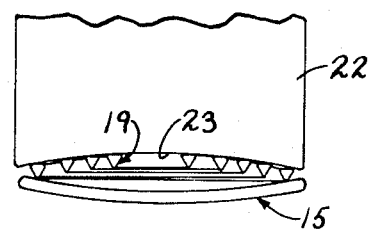
Figure 3 is a diagrammatic view showing a receptacle having a concave bottom surface disposed on the heating element.
Figure 4:
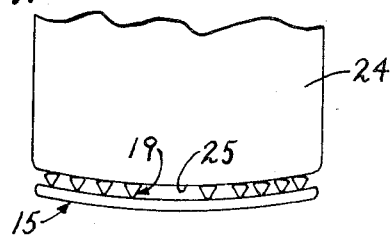
Figure 4 is a view similar to Figure 3, but showing a receptacle having a convex bottom surface disposed on the heating element.

As shown particularly in Figures 2, 3, and 4, the spider or support 15 has an upper surface which is dished, or angles from its outer circumference toward the center, to thereby provide a spider or support having a surface which is generally concave in vertical cross section, the outer convolution only of the heating element 19 normally being engaged and supported by the spider or support.

The tubular sheath of the heating element 19 is of such size and material that the element will have the required flexibility whereby the inner convolutions may be depressed under the influence of the weight of an article thereon, the material having such resiliency that the convolutions will spring back to their original position, wherein the heating element as a whole assumes a shape which is generally frusto-conical or convex in vertical cross section, when weight is removed therefrom. As one illustrative example of a heating element constructed in accordance with this invention, the sheathed resistor element is shaped to provide a top or active surface for each convolution of, for example, one-quarter inch in width, and the tubular sheath is made up of a heat-resistant relatively flexible material such, for example, as "Inconel." It is to be understood, however, that the size and cross-sectional shape of the tubular sheath may be varied, and the material of which the sheath is made may consist of a combination of various metallic constituents to provide a sheath having the requisite properties, all as is well known in the metallurgical art.

With a construction as herein disclosed wherein the outer convolution only of the heating element 19 is normally supported on the spider or support which is, in turn, supported on the ledge or shoulder 14 and the inner convolutions are in successively higher planes and spaced above the spider or support 15 which is, in turn, concave in vertical cross section, the innermost convolutions of the heating element 19 are free to move downwardly under the weight of an article resting thereon until the article is supported by sufficient convolutions to sustain its weight, or until the convolutions on which the article rests are depressed to a degree sufficient to engage the upper surface of the spider or support 15 which acts as an interceptor and which is so designed with respect to the convolutions of the heating element 19 that downward movement of the convolutions under the weight of an article thereon will be intercepted and limited to a degree such that the elastic limit of the heating element, particularly under heating conditions, will not be exceeded.

Referring to Figures 3 and 4, there are illustrated receptacles having two types of heating element contacting bottoms. In Figure 3 there is shown a receptacle 22 having a bottom 23 which is generally concave. As shown, when such a receptacle is placed on the heating element 19, the various convolutions of the heating element, which is generally frusto-conical or convex in vertical cross section as a whole, will contact the entire bottom area of the receptacle 22 whereby heat from the heating element will be transferred to the receptacle by direct contact of the heating element convolutions rather than by convection.

In Figure 4 of the drawings there is shown a receptacle 24 having a heating element contacting bottom 25 which is generally convex. When such a receptacle is placed upon the heating element 19, the inner flexible convolutions of the heating element will be depressed in such manner that the convex bottom 25 will be contacted substantially throughout its area by the convolutions of the heating element 19 to provide for heating of the receptacle by direct contact of the heating element convolutions therewith. As also shown in Figure 4, the spider or support 15 intercepts the downward movement of the heating element convolutions and limits the depression thereof in such manner that the limit of elasticity of the sheath will not be exceeded.

The sheathed heater element 19 may be of various diameters and the variation in height from one convolution to the next may vary in accordance with the use to which the heater element is to be put. By way of illustration, the provision of a sheathed element providing convolutions each having an article receiving surface of one-quarter inch in width may be generally satisfactory, together with a difference in vertical height between successive convolutions of about fifteen-thousandths of an inch. With such arrangement of the convolutions the surface of the spider or support 15 is gradually sloped toward the center thereof from zero to say, for example, one-sixteenth inch, giving the innermost convolution 21 a maximum depression movement of one-eighth inch, with a successively lesser amount of maximum depression movement for each next succeeding convolution up to the outermost convolution which is rigidly supported.

While for illustrative purposes there has been shown the adaptability of the heating element to receptacles or vessels having convex and concave heating element contacting areas, the element likewise adapts itself to receptacles having element contacting areas which may not be concave or convex throughout but only in various portions of the entire area since the convolutions may be depressed on one side of the convolution but not on the other side thereof. Similarly, the convolution arrangement will adapt itself for contact heating of receptacle contacting areas which are on a slant.

In Figures 5 and 6 there is shown a hinge-type mounting for the heating element 19 so arranged as to permit the heating element to be lifted from its normal operative position and swung laterally from over the reflector or drip pan 12 so as to facilitate cleaning the reflector or drip pan 12 and the underside of the heating element 19.

The terminal ends 20 of the heating element 19 are shown as being bent downwardly to a position substantially perpendicular with the general plane of the heating element 19, and when the heating element 19 is assembled with the ring and the reflector and drip pan, the downwardly extending terminal ends 20 extend through an opening 26 in the reflector or drip pan 12.

The terminal ends 20 also extend through openings 27 in a cap 28 whose skirt 29 surrounds the upper end of a sleeve 30 disposed on the terminal ends 20 and secured thereto in a manner to prevent longitudinal movement of the terminal ends 20 in such sleeve. The cap 28 may, in turn, be brazed to the sleeve as at 31 or otherwise secured thereto, to prevent relative rotation of the sleeve and the cap. As shown particularly in Figure 6, the sleeve 30 is provided intermediate its ends with an outwardly extending ear 32, and is provided in its lowermost end with a pair of bayonet slots 34, only one of which is shown.

Another sleeve 35, which is the outer sleeve when assembled with the sleeve 30, is carried by a strap 36 rigidly secured to the bottom of the reflector or drip pan 12 as at 37. This sleeve 35 is provided with a pair of cam surfaces 38 which angle downwardly from one side of the sleeve to the other to terminate in a notch 39. A stop 40 is provided at the top of the cam surfaces for a purpose hereinafter described.

A ring 41 is provided, and such ring has a pair of inwardly extending ears 42 for engagement with the bayonet slots 34 of the sleeve 30, and is also provided with a pair of upstanding ears 43 and an opening 44, the opening 44 being adapted to receive the downturned end of a coiled spring 46. The uppermost and upturned end of the spring 46 engages with an opening 47 in the strap 36, as shown in Figure 5.

In the assembly and operation of this hinge mounting, the terminal ends 20 are disposed through the openings 27 in the cap 28 and through the sleeve 30, the cap and sleeve being rigidly secured to the terminal ends 20 as hereinbefore described. Then, with the heating element directly above the spider or support 15, the sleeve 30 containing the terminal ends 20 is positioned within the sleeve 35 which is rigidly mounted on the strap 36 beneath the opening 26 in the reflector or drip pan 12 and the assembly moved downwardly until the heating element 19 rests on the spider or support 15 and the ear 32 on the sleeve 30 rests in the notch 39 in the sleeve 35. The spring 46 is then positioned to surround the sleeve 35 with the upturned end 48 thereof disposed in the opening 47 in the strap 36, and the ring 41 is positioned on the end of the sleeve 30 with the downturned end 45 of the spring 46 within the opening 44 in the ring 41. The ring 41 is then rotated for one or more turns to wind-up the spring 46 and place the spring under tension, and the ears 42 on the ring engaged with the bayonet slots 34 in the sleeve 30 to prevent relative movement of the ring 41 and the sleeve 30. The spring 46 is such that the tendency thereof to resist compression will firmly hold the ear 32 in the notch 39.

When it is desired to swing the heating element 19 laterally away from a position over the reflector or drip pan 12, the heating element 19 is first moved upwardly to disengage the ear 32 on the sleeve 30 from the notch 39. Then, the heating element 19 may be rotated about the axis of the sleeve 30 to move the heating element 19 laterally away from the reflector or drip pan 12, and such movement is assisted, or completely accomplished, by the tendency of the spring 46 to assume its unwound state. As the heating element 19 is moved laterally, the ear 32 on the sleeve 30 engages and rides up on one of the cam surfaces 38 on the sleeve 35 to continue to raise the heating element 19 as it is moved laterally by being rotated about the axis of the sleeve 30 so that the heating element will ultimately be spaced above the range top. This rotation of the sleeve 30 and lateral movement of the heating element 19 may continue until the ear 32 engages the stop 40 on the sleeve 35, and such unwinding tends to place the spring under compression.

When it is desired to reposition the heating element 19 over the reflector or drip pan 12, and with the outer convolution of the heating element resting on the spider or support 15, the heating element is moved laterally towards such desired position, such movement being assisted by the tendency of the spring to return to its normal expanded condition. Rotation of the sleeve 30 during such lateral movement of the heating element 19 winds up the spring 46 as the ear 32 rides on the downwardly angled cam surface 38 on the sleeve 35. Such rotation of the sleeve 30 and lateral movement of the heating element 19 may continue until the ear 32 registers with the notch 39 in the sleeve 35 at which time the sleeve 30 and the heating element 19 moves sharply downwardly by the expanding action of the compressed spring 46 until the ear 32 rests on the bottom of the notch 39 in the sleeve 35. When this occurs, the heating element 19 will overlie and be in registry with the reflector or drip pan 12, and the outer convolution of the heating element 19 will rest on the outer area of the spider or support 15. As is usual, terminals 50 are provided at the ends of the heating element 19 for connection to a suitable source of electric current.

Referring to the drawings in the preceding description, it will be seen that there is provided a heating element which, while lending itself to the heating of articles or receptacles having a flat heating element contacting surface, will readily adapt itself to articles or receptacles to be heated which have other than flat areas or surfaces for contact with the heating elements, and will adapt itself in such manner that the heating will be accomplished by direct contact of the heating element convolutions with the article or receptacle rather than by convection. Various other advantageous features will be apparent.

What is claimed is:

1. An electric heater, comprising a heating element shaped to provide a plurality of convolutions, with each convolution lying in a successively higher plane in a manner to provide an article receiving area generally convex in vertical cross section, the innermost convolution being the highest, a non-yielding support for the outermost convolution, said heating element being yieldable whereby the inner convolutions are capable of flexing under the weight of an article applied thereto to provide an article receiving area substantially conforming to the surface of such article coincident therewith, and interceptor means disposed below and spanning the inner convolutions of the heating element and adapted to limit depression movement of such convolutions to a degree less than that which would exceed the elastic limit of the material comprising said heating element.

2. An electric heater, comprising a heating element shaped to provide a plurality of convolutions, with each convolution lying in a successively higher plane in a manner to provide an article receiving area generally convex in vertical cross section, the innermost convolution being the highest, a non-yielding support for the outermost convolution, said heating element being yieldable whereby the inner convolutions are capable of flexing under the weight of an article applied thereto to provide an article receiving area substantially conforming to the surface of such article coincident therewith, and interceptor means disposed below and spanning the inner convolutions of the heating element and adapted to limit depression movement of such convolutions to a degree less than that which would exceed the elastic limit of the material comprising said heating element when such convolutions are at article heating temperatures.

3. An electric heater, comprising a heating element shaped to provide a plurality of convolutions, with each convolution lying in a successively higher plane in a manner to provide an article receiving area generally convex in vertical cross section, the innermost convolution being the highest, a non-yielding support for the outermost convolution, said heating element being yieldable whereby the inner convolutions are capable of flexing under the weight of an article applied thereto to provide an article receiving area substantially conforming to the surface of such article coincident therewith, and interceptor means disposed below and spanning the inner convolutions of the heating element and adapted to limit depression movement of such convolutions to a degree less than that which would exceed the elastic limit of the material comprising said heating element, such interceptor means being so disposed with respect to the inner convolutions that the article receiving area may assume a generally concave shape with the innermost convolutions being the lowest.

4. An electric heater, comprising a heating element shaped to provide a plurality of convolutions, with each convolution lying in a successively higher plane in a manner to provide an article receiving area generally convex in vertical cross section, the innermost convolution being the highest, a non-yielding support for the outermost convolution, said heating element being yieldable whereby the inner convolutions are capable of flexing under the weight of an article applied thereto to provide an article receiving area substantially conforming to the surface of such article coincident therewith, and interceptor means disposed below and spanning the inner convolutions of the heating element and adapted to limit depression movement of such convolutions to a degree less than that which would exceed the elastic limit of the material comprising said heating element, said interceptor means including an intercepting surface curved oppositely to the normal curvature of the article receiving surface of the heating element.

5. An electric heater comprising a metallic-sheath type heating element of volute configuration, means for supporting certain of the convolutions against movement, said element having inherent resiliency so that the convolutions are normally urged to predetermined relation but so that the unsupported convolutions may be displaced from predetermined relation by pressure applied thereto, said element having all of its terminals extending from said cerain supported convolutions whereby the unsupported convolutions are free to move without restrictions imposed by terminal connection.

6. An electric heater comprising a metallic-sheath type heating element of volute configuration, means for supporting only the outer convolutions against movement, said element having inherent resiliency so that the convolutions are normally urged to predetermined relation but so that the unsupported inner convolutions may be displaced from predetermined relation by pressure applied thereto, said element having all of its terminals extending from said outer convolutions whereby the unsupported inner convolutions are free to move without restrictions imposed by terminal connection.

7. An electric heater comprising a metallic-sheath type heating element of volute configuration, means for supporting certain of the convolutions against movement yet permitting bodily movement of said heating element, said element having inherent resiliency so that the convolutions are normally urged to predetermined relation but so that the unsupported convolutions may be displaced from predetermined relation by pressure applied thereto, said element having all of its terminals extending from said supported convolutions whereby the unsupported convolutions are free to move without restrictions imposed by terminal connection, and said terminals being disposed for movement relative to said support whereby said heating element may be bodily moved as a unit with respect to said support.

8. An electric heater comprising a metallic-sheath type heating element of volute configuration, means for supporting only the outer convolutions against movement relative to the other convolutions, said element having inherent resiliency so that the convolutions are normally urged to predetermined relation but so that the unsupported inner convolutions may be displaced from predetermined relation by pressure applied thereto, said element having all of its terminals in adjoining relation and extending from said outer convolutions whereby the unsupported inner convolutions are free to move without restriction imposed by terminal connection, said terminals having sliding and pivot connection with said support whereby said element may be shifted bodily toward and away from said support and swung bodily laterally of said support.

9. An electric heater comprising a single self-supporting resilient tube, an electric resistor disposed in electrically-insulated heating relation within said tube and having terminal portions extending outwardly of said tube at spaced places therealong, said tube intermediate said places being formed to provide collateral portions, and means rigidly supporting said tube at said places and at certain of said collateral portions and leaving the remainder of said collateral portions free to yield under pressure.

10. An electric heater comprising a single self-supporting resilient tube, an electric resistor disposed in electrically-insulated heating relation within said tube and having terminal portions extending outwardly of said tube at spaced places therealong, said tube intermediate said places being formed to generally helical shape, and means rigidly supporting said tube at said places and at certain portions of said spiral formation and leaving the remainder of said spiral formation free to yield under pressure.

11. An electric heater comprising a single self-supporting resilient tube, an electric resistor disposed in electrically-insulated heating relation within said tube and having terminal portions extending outwardly of said tube at spaced places therealong, said tube intermediate said places being formed to generally helical shape with said places disposed adjacent to the outer of the convolutions of said shape and the inner convolutions being displaced in an axial direction relative to said outer convolutions, and means for rigidly supporting at least a part of said outer convolution and leaving said inner convolutions free to yield under pressure.

12. An electric heater comprising a self-supporting tube, an electric resistor disposed in electrically-insulated heating relation within said tube and having terminal portions extending outwardly of the ends of said tube, said tube intermediate its ends being formed to generally spiral shape and comprising a first spiral portion extending inwardly from one end of said tube and a second spiral portion extending inwardly from the opposite end of said tube, said first and second spiral portions being interlaced and relatively disposed to provide an active heating surface adapted to support a vessel to be heated.

13. An electric heater comprising a self-supporting resilient tube, an electric resistor disposed in electrically-insulated heating relation within said tube and having terminal portions extending outwardly of the ends of said tube, said tube intermediate its ends being formed to generally spiral shape and comprising a first spiral portion extending inwardly from one end of said tube and a second spiral portion extending inwardly from an opposite end of said tube, said first and second spiral portions being interlaced and relatively disposed to provide an active heating surface adapted to support a vessel to be heated, and means for rigidly supporting the outermost of the convolutions forming said spiral shape and leaving the innermost convolutions free to yield under pressure.

14. An electric heater comprising a self-supporting tube, an electric resistor disposed in electrically-insulated heating relation within said tube and having terminal portions extending outwardly of the ends of said tube, said tube intermediate its ends being formed to generally spiral shape with said ends disposed together, and comprising a first spiral portion extending inwardly from one end of said tube and a second spiral portion extending inwardly from the opposite end of said tube, said first and second spiral portions being interlaced and relatively disposed to provide an active heating surface adapted to support a vessel to be heated, and a support providing a socket for receiving the ends of said tube.

15. An electric heating element comprising a self-supporting resilient tube, an electric resistor disposed in electrically-insulated heating relation within said tube and having terminal portions extending outwardly of the ends of said tube, said tube intermediate its ends being formed to generally spiral shape with its ends disposed together at the outermost of the spiral convolutions and extending in the direction of the axis of said spiral, said spiral shape comprising a first spiral portion extending inwardly from one end of said tube and a second spiral portion extending inwardly from the opposite end of the tube, said first and second spiral portions being interlaced and relatively disposed to provide an active heating surface adapted to support a vessel to be heated, and means rigidly supporting the outermost of the spiral convolutions and leaving the remainder of said spiral shape free to yield under pressure, said support including a socket for receiving pintle means comprising the end portions of said tube.

References Cited in the file of this patent

UNITED STATES PATENTS

| | | |
|---|---|---|
| 2,028,604 | Hermanni | Jan. 21, 1936 |
| 2,250,357 | Challet | July 22, 1941 |
| 2,270,293 | Grunder | Jan. 20, 1942 |
| 2,272,658 | Challet | Feb. 10, 1942 |
| 2,288,967 | Challet | July 7, 1942 |
| 2,615,117 | Tillapaugh | Oct. 21, 1952 |

FOREIGN PATENTS

| | | |
|---|---|---|
| 643,829 | Germany | Dec. 7, 1935 |